June 10, 1952     O. A. SUTTON     2,599,730
FLEXIBLE COUPLING FOR FAN MOUNTINGS
Filed July 3, 1950
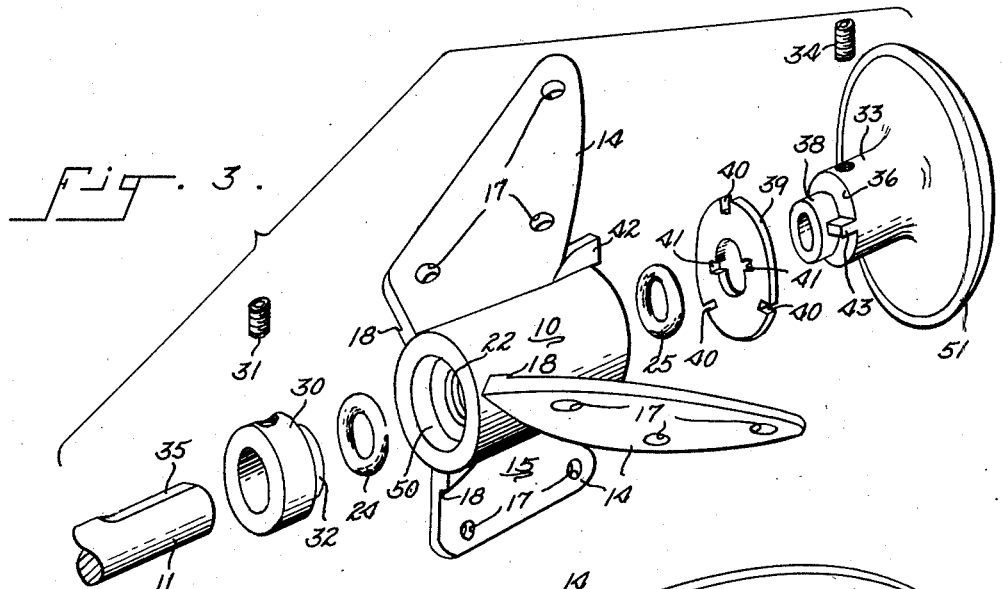
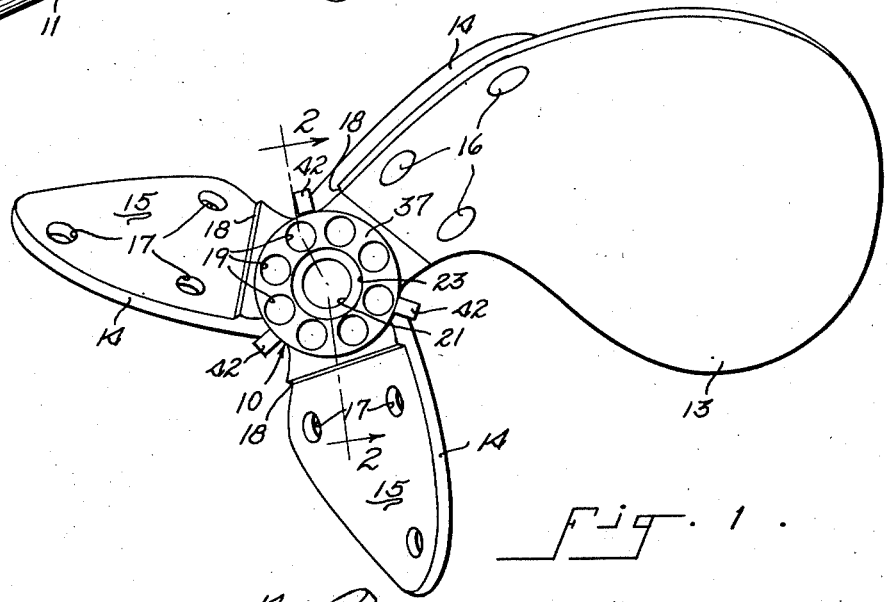
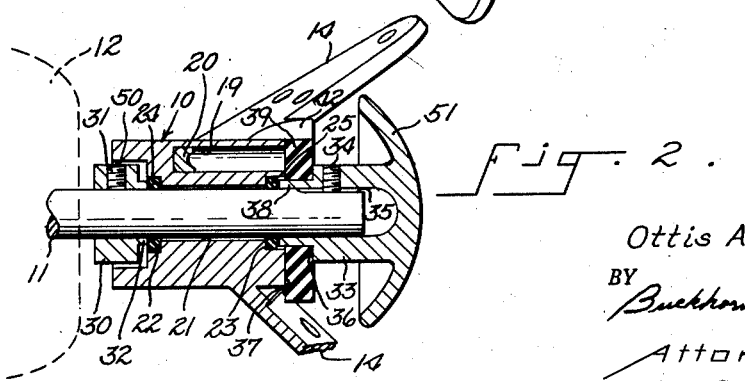
INVENTOR.
Ottis A. Sutton
BY
Buckhorn and Cheatham
Attorneys Patented June 10, 1952

2,599,730

UNITED STATES PATENT OFFICE 2,599,730

FLEXIBLE COUPLING FOR FAN MOUNTINGS

Ottis A. Sutton, Wichita, Kans., assignor to The
O. A. Sutton Corporation, Inc., Wichita, Kans.,
a corporation of Kansas Application July 3, 1950, Serial No. 171,860

3 Claims. (Cl. 64—11)

1

The present invention comprises means for mounting a driven member upon a shaft in such manner as to prevent or reduce the transmission of noises, and to prevent or reduce the transmission of vibration, from the driven member to the driving member or vice versa, the invention being of particular utility in the mounting of a fan or an air propeller upon a driving shaft.

Many previous attempts have been made to achieve the objects of the present invention, but in all such attempts of which applicant is aware the construction comprises a nonmetallic and in some cases resilient, member which is theoretically supposed to achieve the objects of reduction of noise and vibration transmission, but in which some metallic member such as a setscrew or the like passes through the hub of the driven member into contact with the driving member, thus canceling any desirable effect of the resilient nonmetallic and sometimes member. The present invention is designed to achieve the maximum isolation of the driving member from the driven member since all metallic parts of one will be separated from metallic parts of the other by deformable, nonmetallic, resilient O-rings and a nonmetallic driving washer.

The objects and advantages of the present invention will be more readily ascertained by inspection of the following specification taken in connection with the accompanying drawing wherein like numerals refer to like parts throughout, while the features of novelty will be more distinctly pointed out in the appended claims.

In the drawing,

Fig. 1 is a front view of a fan hub embodying the present invention, one blade of the fan being illustrated;

Fig. 2 is a vertical section taken substantially along line 2—2 of Fig. 1; and

Fig. 3 is an exploded, isometric view of the various parts of the invention.

The invention is herein illustrated as comprising a fan including a substantially cylindrical hub 10 mounted upon a driving shaft 11, which may constitute the armature shaft of an electric motor indicated in skeleton outline 12. The hub 10 may have a plurality of fan blades or an air propelling rotor or other operating means attached thereto which would be subject to vibration and which would create noise in operation, in the present illustration the hub having a plurality of fan blades 13 mounted thereon as by means of a plurality of blade mounting extensions 14 having inclined surfaces 15 upon which the inner portions of the blades are mounted by

2 means of rivets 16 passing through holes 17, the faces 15 being recessed so as to provide shoulders 18 against which the bases of the fan blades abut. A plurality of longitudinally extending holes 19 are drilled into the hub 10 from one end so as to provide means for reception of balancing slugs 20. It is to be appreciated that the foregoing details are illustrative of one type of apparatus in which the invention may be embodied.

In accordance with the present invention the hub 10 is provided with an axial bore 21 of larger diameter than the diameter of the shaft 11 which extends through the bore. The hub is provided with a coaxial recess 22 at one end of the bore 21 and a similar coaxial recess 23 at the other end of the bore 21. A deformable, nonmetallic, preferably resilient ring, such as a rubber O-ring 24, is firmly seated in the recess 22 and a corresponding ring 25 is firmly seated in the opposite recess 23, the rings being in snug contact with the shaft 11 and the surfaces of the recesses to hold the adjacent surfaces of the bore 21 and the shaft 11 uniformly spaced apart throughout, the rings being of sufficient hardness to maintain said surfaces spaced apart regardless of the vibrations encountered in normal operation.

A first collar 30 is fixed to the shaft 11 as by means of a setscrew 31, the collar being provided with a projecting portion 32 of smaller diameter than the diameter of the recess 22 and which projects forwardly to hold the ring 24 firmly in position. A second collar 33 is mounted upon the outer end of the shaft and retained thereon by means of a setscrew 34 preferably engaging a flat surface 35 on the shaft. The collar 33 is provided with a shoulder 36 spaced from and parallel to the outer end wall 37 of the hub, the two defining therebetween a slot, the bottom of which is provided by a reduced portion 38 of the second collar which projects rearwardly into firm contact with the ring 25. A nonmetallic driving washer 39 is seated in the above-mentioned groove with its inner surface in contact with the end wall 37 of the hub and its outer surface in contact with the shoulder 36 on the outer collar. The washer 39 is provided with a plurality of peripheral notches 40 and a plurality of internal notches 41, the notches being spaced apart so that there is an intervening portion of the washer between any notch 40 and any notch 41. The adjacent end of the hub 10 is provided with a plurality of forwardly projecting lugs 42, each of which is snugly engageable in one of the notches 40, and the second collar 33 is provided with a plurality of rearwardly extending lugs 43, each of which is snugly receivable in one of the inner notches 41, whereby driving torque is transmitted from the shaft 11 through the washer 39.

The first collar 30 is preferably of lesser diameter than the diameter of the hub 10 and the end of the hub is provided with a recess 50 into which the collar may extend so as to provide means to prevent access to the locking screw 31 until the outer collar is removed, the inner surface of the recess 50 being spaced from the collar 30 throughout. The outer collar 33 may comprise an ornamental hub cap, such as by extending the collar to provide a rounded medallion supporting head 51.

Having illustrated and described a preferred embodiment of my invention, it should be apparent to those skilled in the art that the invention permits of modification in detail and arrangement. I claim as my invention all such modifications as come within the true spirit and scope of the appended claims.

I claim:

1. In a fan assembly, a hub having an axial bore therethrough, a driving shaft extending through said bore, said bore being of larger internal diameter than the external diameter of said shaft and said hub having an outwardly opening recess at each end thereof of larger diameter than the diameter of the bore and coaxial with the bore, a pair of deformable nonmetallic rings each snugly seated in one of said recesses, said rings snugly encircling said shaft and normally holding the adjacent surfaces of said bore and said shaft uniformly spaced apart throughout, a collar fixed to said shaft, said collar having a cylindrical portion bearing against one of said rings and of lesser external diameter than the internal diameter of the adjacent recess, an end member fixed to the outer end of said shaft and including an annular inner end portion bearing against the other of said rings and of lesser external diameter than the internal diameter of the adjacent recess, said end member having an annular shoulder spaced from the adjacent end of said hub and defining therewith an annular groove, said hub comprising a plurality of lugs projecting toward said end member and said end member comprising a plurality of other lugs projecting toward said hub, and a nonmetallic driving washer seated in said groove, said driving washer having a first set of notches therein snugly receiving the lugs on said hub and a second set of notches therein snugly receiving said other lugs on the end member, all of said notches being spaced apart whereby driving torque is transmitted from said shaft to said hub through intervening portions of said driving washer.

2. In a fan assembly, a hub having an axial bore therethrough, a driving shaft extending through said bore, said bore being of larger internal diameter than the external diameter of said shaft and having a coaxial recess at each end thereof of larger diameter than the diameter of the bore, a pair of nonmetallic, deformable rings of uniform cross-section throughout each seated in one of said recesses, said rings snugly encircling said shaft and normally holding the adjacent surfaces of said bore and said shaft uniformly spaced apart throughout, a collar fixed to said shaft, said collar having a portion bearing against one of said rings and of lesser external diameter than the internal diameter of the adjacent recess, a second collar fixed to said shaft and including an annular inner end portion bearing against the other of said rings and of lesser external diameter than the internal diameter of the adjacent recess, said second collar having an annular shoulder spaced from the adjacent end of said hub and defining therewith an annular groove, a nonmetallic driving washer snugly seated in said groove, first complementary interlocking means formed on said hub and said driving washer, and second complementary interlocking means formed on said end member and said driving washer, said first and second means being spaced apart whereby driving torque is transmitted from said shaft to said hub through portions of said driving washer.

3. In a fan assembly, a fan hub having an axial bore therethrough, a driving shaft extending through said bore, said hub having a recess at each end defining a coaxial enlargement of said bore and said bore being of larger internal diameter than the external diameter of said shaft, a pair of rubber O-rings each snugly surrounding said shaft at one end of said hub and snugly seated in the recess therein, said O-rings being of sufficient hardness to maintain the adjacent surfaces of said shaft and hub spaced apart at all times, a pair of collars surrounding said shaft and fixed thereto, one of said collars being at each end of said hub and each of said collars bearing against one of said O-rings whereby said hub is held against axial displacement along said shaft, one of said collars comprising a portion of reduced diameter extending outwardly from said hub and a portion of larger diameter spaced from the end of said hub, the two portions thereof being separated by a shoulder, a nonmetallic washer seated on said portion of reduced diameter and having its end surfaces snugly engaging the end of said hub and said shoulder, a plurality of driving lugs on said one collar and a plurality of driven lugs on the adjacent end of said hub, said washer having a plurality of first notches therein each receiving one of said driving lugs and a plurality of second notches therein each receiving one of said driven lugs, said notches being spaced apart whereby driving torque is transmitted from said shaft to said hub through portions of said washer.

OTTIS A. SUTTON.

REFERENCES CITED

The following references are of record in the file of this patent:

UNITED STATES PATENTS

| Number | Name | Date |
|---|---|---|
| 2,164,485 | Yantis | July 4, 1939 |
| 2,235,605 | Bugatti | Mar. 18, 1941 |